US010560364B1

(12) United States Patent
Kondaveeti et al.

(10) Patent No.: US 10,560,364 B1
(45) Date of Patent: Feb. 11, 2020

(54) DETECTING NETWORK ANOMALIES USING NODE SCORING

(71) Applicant: Pivotal Software, Inc., San Francisco, CA (US)

(72) Inventors: Anirudh Kondaveeti, Foster City, CA (US); Robert Paul Bennett, Middle Village, NY (US); Jonathan Scott Hajek, South Orange, NJ (US)

(73) Assignee: Pivotal Software, Inc., San Francisco, CA (US)

( * ) Notice: Subject to any disclaimer, the term of this patent is extended or adjusted under 35 U.S.C. 154(b) by 303 days.

(21) Appl. No.: 15/460,054

(22) Filed: Mar. 15, 2017

(51) Int. Cl.
*G06F 15/173* (2006.01)
*H04L 12/26* (2006.01)
*H04L 29/08* (2006.01)

(52) U.S. Cl.
CPC ............ *H04L 43/50* (2013.01); *H04L 43/16* (2013.01); *H04L 67/10* (2013.01)

(58) Field of Classification Search
CPC . H04L 43/062; H04L 41/0893; H04L 41/145; H04L 43/00; H04L 63/1408; H04L 63/1425
USPC ................................................ 709/223, 224
See application file for complete search history.

(56) References Cited

U.S. PATENT DOCUMENTS 9,516,053 B1 * 12/2016 Muddu ................ G06F 16/254

OTHER PUBLICATIONS

Akoglu et al., "Graph based Anomaly Detection and Description: A Survey," Data Mining and Knowledge Discovery, dated Apr. 28, 2014, 68 pages.
'pr.efactory.de' [online]. "The PageRank Algorithm," Aug. 2, 2002, [Retrieved on Sep. 7, 2017]. Retrieved from the Internet: URL < http://pr.efactory.de/e-pagerank-algorithm.shtml >, 4 pages.
'en.wikipedia.org' [online]. "HITS algorithm," Sep. 8, 2017, [Retrieved Sep. 7, 2017]. Retrieved from the Internet : URL < https://en.wikipedia.org/wiki/HITS_algorithm >, 5 pages.

* cited by examiner

*Primary Examiner* — Wing F Chan
*Assistant Examiner* — Andrew Woo
(74) *Attorney, Agent, or Firm* — Fish & Richardson P.C.

(57) ABSTRACT

Systems, methods, and computer program products for detecting network anomalies using node scoring. A network analysis system designates each server computer in a distributed computing network as a node in a graph. The network analysis system constructs a first graph of the distributed computing network for a training period. The system then determines a respective first node score of each node. The system constructs a second graph of the distributed computing network for a test time period. The system then reduces the second graph by removing those edges from the second graph that appear in both the first graph and the second graph. The system determines a respective second node score of each node in the reduced second graph. The system computes differences between the first node scores and the second node scores. The system designates nodes associated with the highest differences as anomalous nodes.

14 Claims, 4 Drawing Sheets

DETECTING NETWORK ANOMALIES USING NODE SCORING

This disclosure relates to network security.

In a distributed computing system, a complex application may have multiple components distributed on different server computers in a network. Each server computer may authenticate and authorize a user accessing the application. Components of the application may call one other. Accordingly, for example, a first server computer hosting a first component may request access to a second server computer hosting a second component. The second server computer may, in turn, request access to a third server computer hosting a third component. Each of the first, second and third server computers may perform respective authentication and authorization in respective ways. The distributed computing environment may be subject to various network attacks. For example, an attacker who stole user account information, e.g., credentials including user names and passwords, may successfully log into a server computer using the stolen credentials, and attempt to access other server computers in the network from the compromised server computer. Since the attacker provided the correct credentials, the system may not be able to differentiated between the attacker and a legitimate user.

SUMMARY

This specification describes techniques of detecting network anomalies using node scoring. A network analysis system designates each server computer in a distributed computing network as a respective node in a graph. The system connects nodes with directed edges for server computers that access one another. The system thus constructs a first graph of the distributed computing network for a reference period, e.g., six weeks. The system then determines a respective first node score of each node based on a node scoring algorithm. The system constructs a second graph of the distributed computing network for a test time period, e.g., one week, during which attack may have occurred. The system then reduces the second graph by removing those edges from the second graph that appear in both the first graph and the second graph. The system determines a respective second score of each node in the reduced second graph. The system computes differences between the first scores and the second scores. The system designates nodes associated with the highest differences as anomalous nodes.

The techniques disclosed in this specification can be implemented in various embodiments so as to realize one or more of the following advantages. The disclosed techniques can detect anomalous access patterns, and thus detect attacks on a network, even when attackers successfully log into the network. The disclosed techniques improve upon conventional attack detection techniques by detecting those attacks that originate from attackers that submitted valid credentials for authentication and authorization. Accordingly, if an attacker has broken a first line of defense provided by conventional authentication and authorization techniques, the disclosed techniques may still discover the attack.

Application of the disclosed techniques are not limited to cyber security. The disclosed techniques can detect anomalous communication patterns over time. Accordingly, the disclosed techniques can detect for example, changes in network activities due to a system upgrade, and whether the upgrade caused intended or unintended changes effects. In addition, the disclosed techniques can be implemented to model user behavior by detecting, for example, effectiveness of an advertisement, or a web page redesign, based on amount of changes in traffic pattern the advertisement induces.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
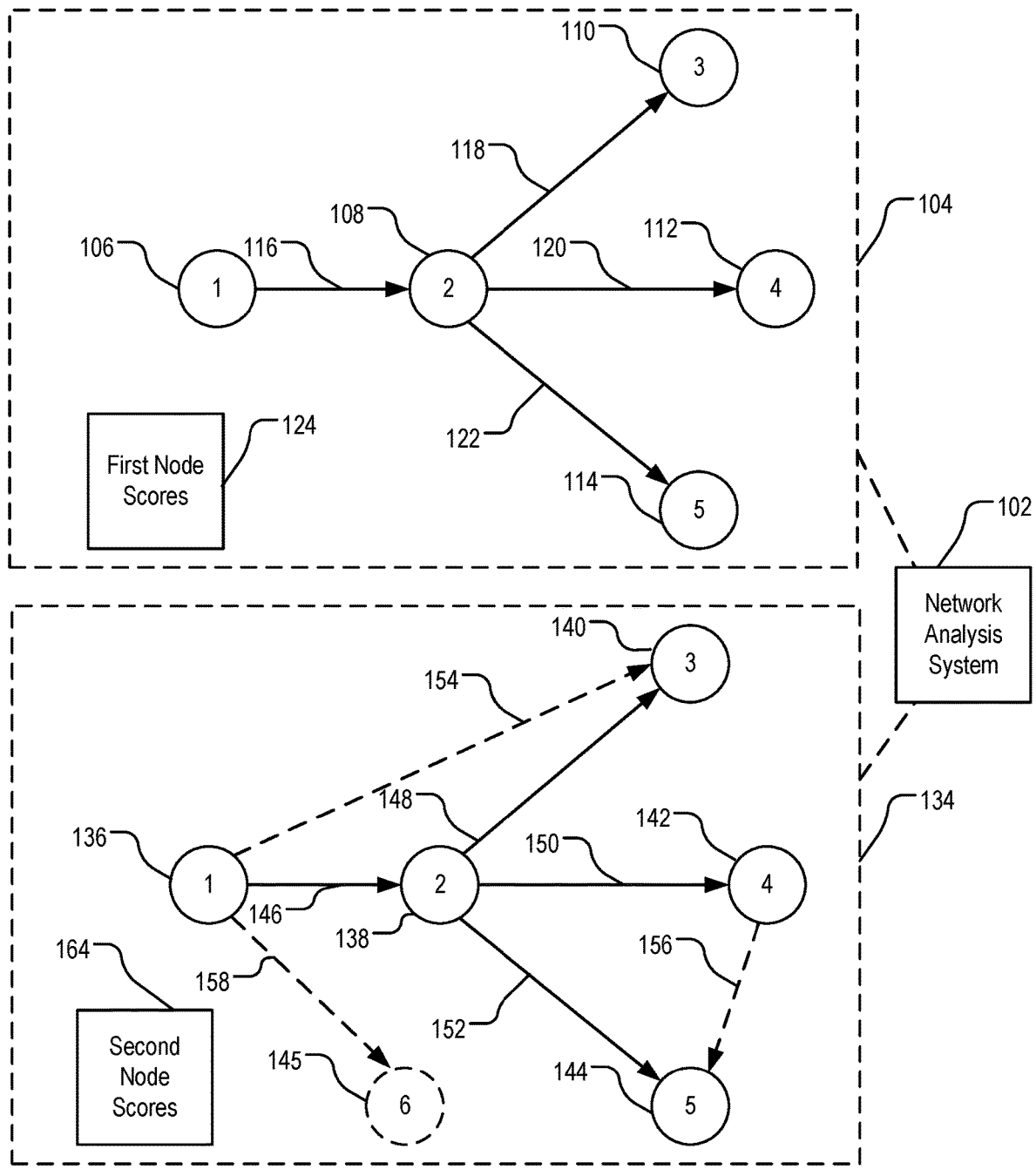
FIG. 1 is a diagram illustrating example graphs used in determining network anomalies based on node scoring.

FIG. 1 is a diagram illustrating example graphs used in determining network anomalies based on node scoring. A network analysis system 102 monitors a distributed computing system (not shown) including one or more server computers. Each of the network analysis system 102 and the one or more server computers includes one or more processors. One or more users, each corresponding to a user account, can access the distributed computing system.

For each user, the network analysis system 102 generates respective graphs representing the server computers that the user accessed. For example, for a particular user X, the network analysis system 102 generates a first graph 104. The first graph 104, also referred to as a training graph, includes multiple first nodes, e.g., first nodes 106, 108, 110, 112 and 114. Each of the first nodes 106, 108, 110, 112 and 114 represents a server computer, e.g., computers 1, 2, 3, 4 and 5, respectively, that the user directly or indirectly accesses. Each access can be a result of a request that has gone through a successful authentication, a successful authorization, or both. The authentication and authorization can be performed at the server computers or at a security service. The network analysis system 102 represents each access with a directional edge. The network analysis system 102 can determine the access from system access records, e.g., log data.

For example, from log data on the server computers, the network analysis system 102 determines that user X logged into computer 1 at a particular time. The user X invoked a function, e.g., an application, on computer 1. The function then invokes a function module on computer 2. Computer 2 successfully authenticates and authorizes the invocation. In response, the network analysis system 102 represents the invocation by an edge 116 between node 106 and node 108. A direction of the edge 116, pointing to computer 2 that is being called, represents a direction of the invocation.

The first graph 104 can represent typical user behavior. For example, the first graph 104 can indicate which server computers does user X log into, which server computers does user X log in from, how often, in what order, which application does the user launch, whether the user launch scripted jobs or cron jobs, whether the user installs new services.

Likewise, the network analysis system 102 determines that computer 2, upon successfully authenticating and authorizing the call, invokes function modules on computer 3, 4 and 5, respectively. The network analysis system 102 determines that each of the computers 3, 4 and 5 successfully authenticates and authorizes the respective invocation. In response, the network analysis system 102 represents the invocations using edges 118, 120 and 122, respectively.

The network analysis system 102 can generate the first graph 104 from reference data, also referred to as training data. The reference data can include log entries that the network analysis system 102 gathered over a training time period. The training time period is specified period of time, e.g., six weeks, that is sufficiently long to establish a pattern of normal network activities. The network analysis system 102 can represent each individual access within the training time period with a respective edge in the first graph 104. Accordingly, although one single edge is shown between a corresponding pair of nodes, the network analysis system 102 may place multiple edges between a same pair of nodes. The network analysis system 102 can gather respective reference data for each user. Accordingly, while the first graph 104 correspond to user X in this example, a different first graph may correspond to a user B. The different first graphs can represent different activity patterns.

The network analysis system 102 determines first node scores 124 for the first graph 104. The first node scores 124 can include one or more respective node scores for each node in the first graph 104. The one or more respective node scores measure importance of a respective node. The importance can be a function of popularity of the corresponding node, as indicated by, for example, how many incoming edges are connected to the node. The network analysis system 102 can determine the first node scores 124 using various available node scoring algorithms, e.g., PageRank or hyperlink-induced topic search (HITS) algorithms.

The network analysis system 102 generates second graph 134 based on test data. The test data includes, for example, log entries that the network analysis system 102 gathered over test time period. The test time period is a period of time for which the network analysis system 102 determines whether anomalous activities happened, and a degree of anomaly the activities are. The network analysis system 102 can gather the test data for a particular user, in this example, user X.

The second graph 134 can indicate whether activities of the user X is typical during the test time period. For example, the second graph 134 can indicate whether the activities are typical for user X, whether the activities are typical for a member of a particular group, e.g., a given department, or whether the activities are typical for someone in the job role of user X.

In the example shown, the second graph 134 includes second nodes 136, 138, 140, 142 and 144, representing the same computers 1-5 as represented in the first graph 104. In addition, the second graph 134 includes a second node 145. The terms "first node" and "second node" as used in this specification indicate that the nodes are in different graphs. No particular temporal order or order of access is implied. The order of access, for example, is represented by directions of the edges. The second node 145 represents a server computer 6, which was accessed during the test time period, but not accessed during the training time period. The network analysis system 102 connects the nodes by edges. Here, edges 146, 148, 150 and 152 connect nodes 136, 138, 140, 142 and 144. Additional edge 154 from node 136 to node 140 indicates that computer 1 represented by the node 136 accessed computer 3 represented by node 140. Likewise, additional edge 156 from node 142 to node 144 indicates that computer 4 represented by the node 142 accessed computer 5 represented by node 144. Edge 158 indicates that computer 1 accessed computer 6. The edges 154, 156 and 158 appear in the second graph 134 do not show in the first graph 104, indicating that corresponding accesses occurred in the test time period but not the training time period.

For convenience and clarity, only one respective edge is shown between a pair of corresponding nodes. In a graph, multiple edges between a pair of nodes are possible, indicating multiple accesses, for example, at different time.

The network analysis system 102 then reduces the second graph 134 by removing edges, if any, that appear both in the first graph 104 and the second graph 134. The reduction can remove noise that may affect node scoring. The network analysis system 102 then determines second node scores 164 for the second graph 134. The network analysis system 102 can determine the second node scores 164 using the same algorithm that the network analysis system 102 used to determine the first node scores 124. The second node scores 164 includes one or more respective node scores for each second node in the second graph 134.

The network analysis system 102 compares the second node scores 164 with the first node scores 124. For each second node in the second graph 134, the network analysis system 102 determines a respective difference between the score of the second node in the second node scores 164 and the score of the corresponding first node in the first node score 124. The differences can indicate a degree of anomaly of activities of user X. The network analysis system 102 can determine that a high degree of anomaly, e.g., that is above a threshold, may correspond to an attack where an attacker broke into the account of user X and accessed server computers using the identity of user X.

The network analysis system 102 ranks the second nodes in the second graph 134 based on the differences. For example, the network analysis system 102 can rank the second node that has the highest differences at the top. The network analysis system 102 can designate one or more nodes that are ranked at the top as the most anomalous nodes for a particular user, in this example, user X.

Figure 2:
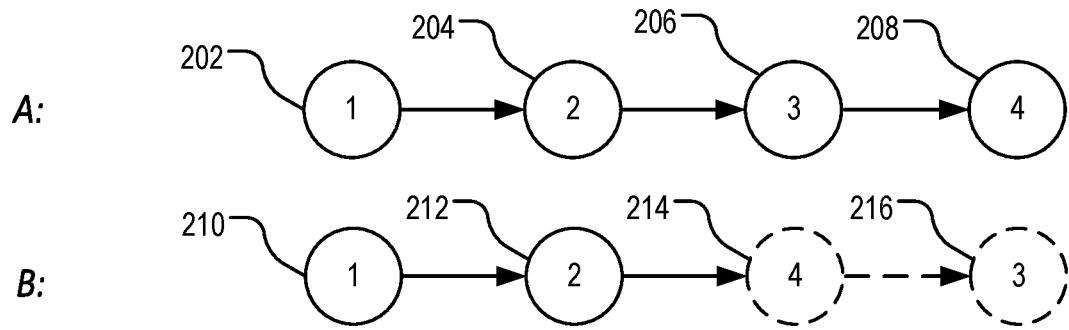
FIG. 2 is a diagram illustrating example node scoring techniques.

FIG. 2 is a diagram illustrating example node scoring techniques. A network analysis system, e.g., the network analysis system 102 of FIG. 1 (not shown), generates a first graph for a training time period. The first graph, labeled A in FIG. 2, includes first nodes 202, 204, 206 and 208, representing server computers 1, 2, 3 and 4, respectively. The order of access, as represented in the first graph, is from server computer 1 to server computer 2 to server computer 3 and to server computer 4.

The network analysis system generates a second graph for a test time period. The second graph, labeled B in FIG. 2, includes second nodes 210, 212, 214 and 216, representing server computers 1, 2, 4 and 3, respectively. The order of access is from server computer 1 to server computer 2 to server computer 4 and to server computer 3. Compared to the first graph, the access order of server computers 3 and 4 are reversed, as represented in the second graph.

The network analysis system generates node scores for the first graph and second graph. The node scores corresponding to server computers 3 and 4 in the second graph are different from those in the first graph, due to the difference in order.

For example, the network analysis system can generate PageRank scores 218. The PageRank scores 218 include respective scores for nodes corresponding to server computers 1 through 4 in the first graph and the second graph. Everything else being same, the PageRank scores for nodes corresponding to server computer 1 and server computer 2 are the same for the training time period and the test time period. Due to the different access order of the server computer 3 and the server computer 4, the scores for nodes corresponding to server computer 3 and server computer 4 are different for the training time period and the test time period. Accordingly, the network analysis system can determine that server computers 3 and 4 are anomalous.

Likewise, the network analysis system can generate HITS scores 220. The HITS scores 220 include respective scores for first nodes and second nodes corresponding to server computers 1 through 4 in the first graph and the second graph. For each node in each graph, the network analysis system determines a hub value and an authority value. The hub value estimates a value of links from the node to other nodes. The authority value indicates the value of the content of the node. Everything else being same, the HITS scores for nodes corresponding to server computer 1 and server computer 2 are the same for the training time period and the test time period. Due to the different access order of the server computer 3 and the server computer 4, the HITS scores, e.g., the hub values, for nodes corresponding to server computer 3 and server computer 4 are different for the training time period and the test time period. Accordingly, the network analysis system can determine that server computers 3 and 4 are anomalous.

PageRank scores 218 and HITS score 220 are provided in FIG. 2 as examples. Other node scoring techniques can be used. The first node scores 124 and second node scores 164 can be PageRank scores, HITS scores, or other node scores.

Figure 3:
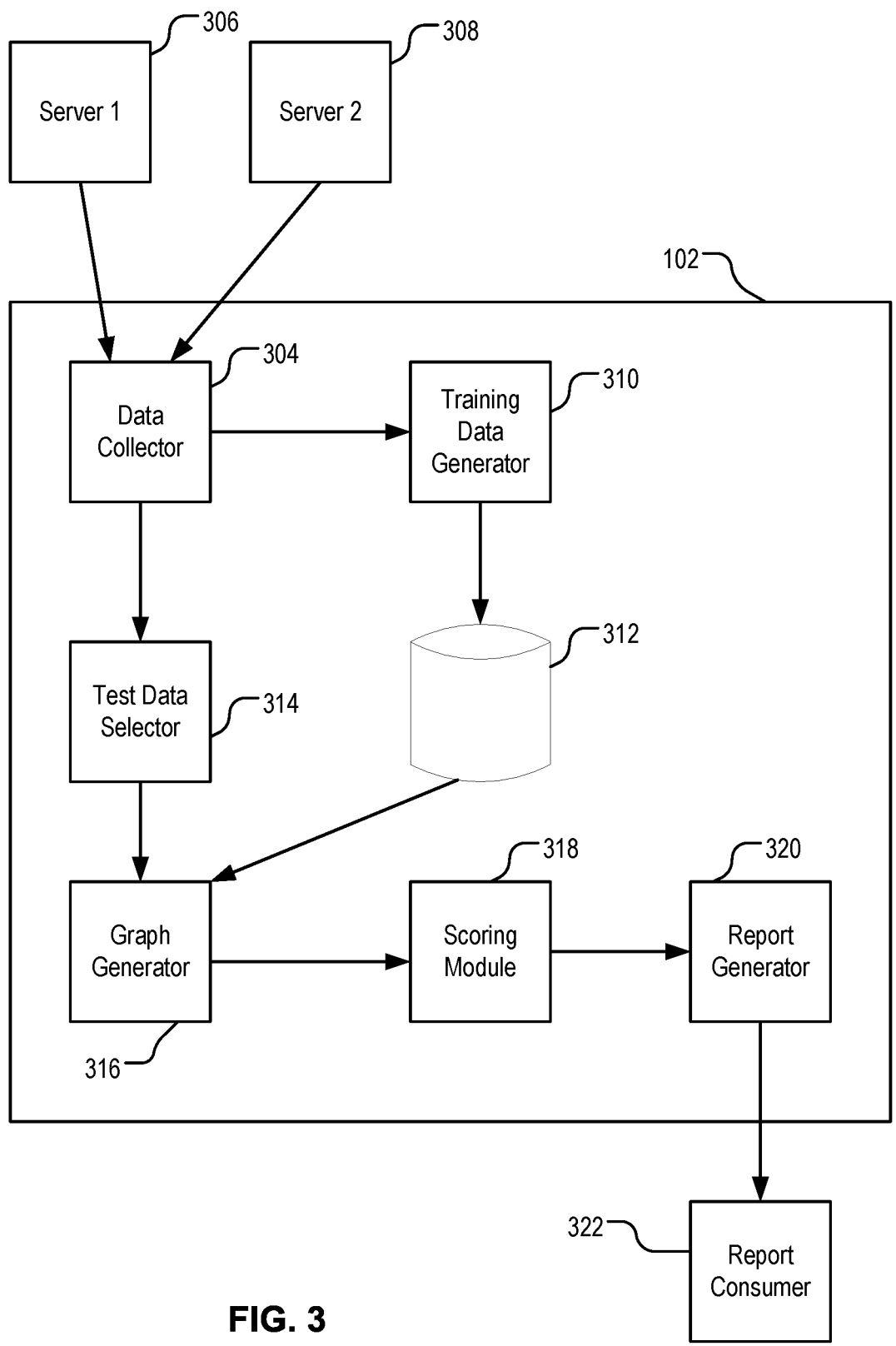
FIG. 3 is a block diagram of an example network analysis system.

FIG. 3 is a block diagram of an example network analysis system 102. The network analysis system 102 includes a data collector 304. The data collector 304 can include one or more hardware and software components for collecting data from one or more server computers, e.g., server computers 306 and 308. The data can include access logs. The data collector 304 can parse the logs and extract access information over arbitrary periods of time.

The data collector 304 provides the access information to a training data generator 310. The training data generator 310 can include one or more hardware and software components for determine training data from the access information. The training data generator 310 can determine the training data, for example, by selecting data corresponding to a pre-specified and configurable training time period. The training time period can include a continuous time period or an aggregation of multiple time periods, e.g., weekdays and weekends, business hours and after hours. A specific training time period can be, for example, over X weeks on weekdays. Likewise, another training time period can be over Y weeks during business hours, and so on. The training data generator 310 can store the training data in training data store 312.

The data collector 304 provides the access information to a test data selector 314. The test data selector 314 can include one or more hardware and software components for selecting test data from the access information based on specified test time period. The test data selector 314 can receive the test time period from a user input or from a network monitoring application. The test data selector 314 can determine the test time period in response to discovering other suspicious activities, e.g., sudden increases in total amount of traffic. The test data selector 314 can determine the test time period to cover time before the suspicious activities and time after the suspicious activities. The test time period can be shorter than the training time period. The test time period may or may not overlap the training time period.

The network analysis system 102 includes a graph generator 316. The graph generator 316 can include one or more hardware and software components for generating a training graph based on training data selected from training data store 312. The graph generator 316 can generate a test graph based on test data corresponding the test data provided by the test data selector 314. The graph generator 316 can generate one or more respective training graphs and respective test graphs for each user or each group of users. The graph generator 316 can reduce the test graph by removing edges in the test graph that also appear in the training graph. The graph generator 316 can provide the training graph and the reduced test graph to a scoring model 318.

The scoring model 318 can include one or more hardware and software components for determining one or more respective scores for each node in the training graph and the reduced test graph. The scoring can be based on PageRank, HITS, or other algorithms. The scoring model 318 can determine differences between scores of the nodes in the reduced test graph and scores of the nodes in the training graph. The scoring model 318 can rank the nodes in the reduced test graph based on the differences. The scoring model 318 can provide the ranked nodes to a report generator 320.

The report generator 320 can include one or more hardware and software components for determining anomalous server computers based on the ranked nodes. For each user, the report generator 320 can have a respective threshold value. The report generator 320 can determine that each of the server computers corresponding to a node having a difference that is above the threshold value is anomalous. The report generator 320 can determine which server computers is the most anomalous based on the ranking. The report generator 320 can generate a respective report for each user, or an aggregated report for a group of users. The report generator 320 can provide the report to a report consumer 322. The report consumer 322 can be a computer configured to present the report on one or more display devices, send the report to a printer, or store the report for additional data analysis.

Figure 4:
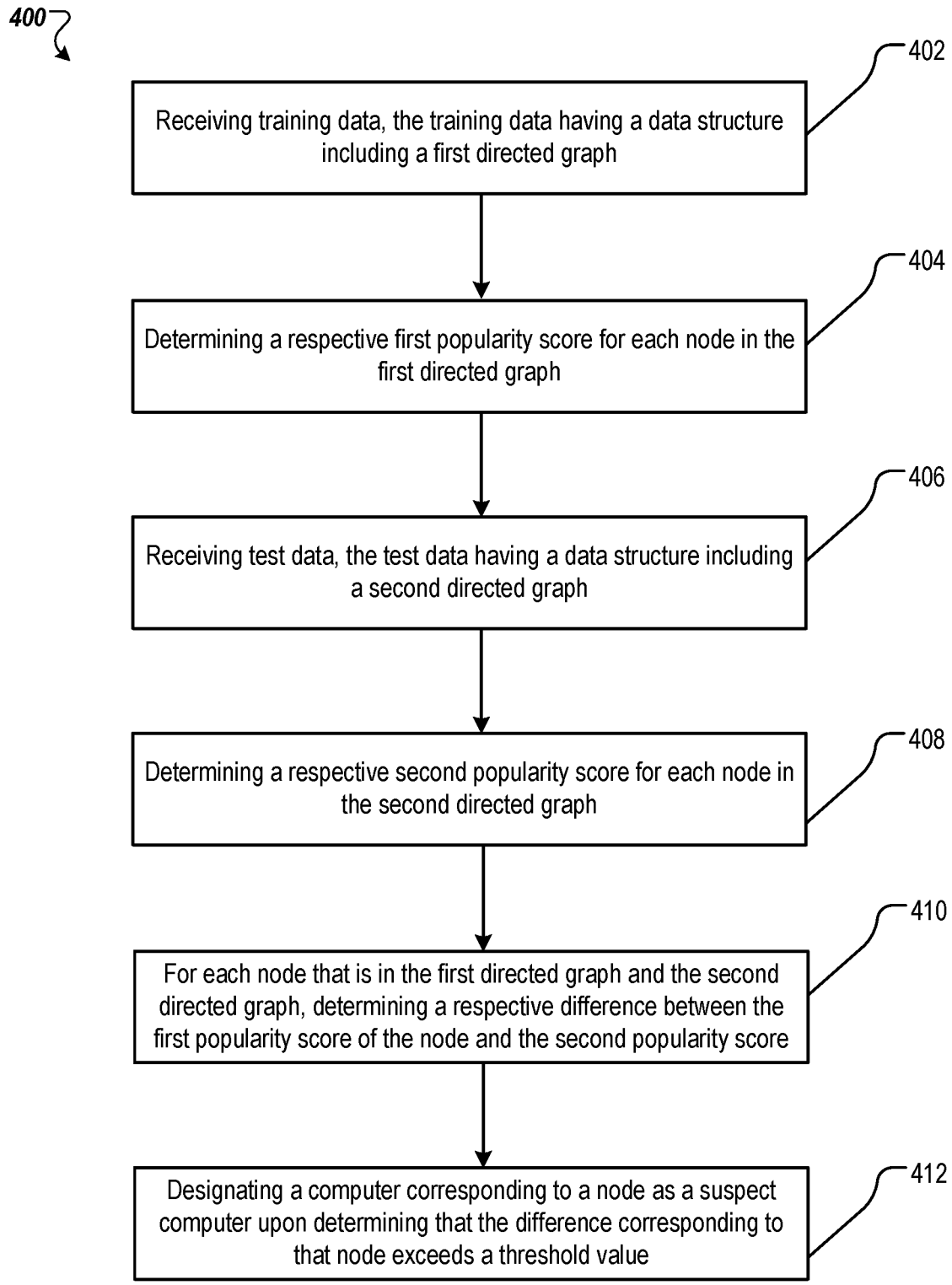
FIG. 4 is a flowchart of an example process of determining network anomalies based on node scoring.

FIG. 4 is a flowchart of an example process 400 of determining network anomalies based on node scoring. The process 400 can be performed by a network analysis system, e.g., the network analysis system of FIG. 1.

The system receives (402) training data. The training data can have a data structure including a first directed graph. The first directed graph includes first nodes and first directed edges between the first nodes. Each first node represents a respective computer in a network. Each first directed edge represents a request from a computer in the network to access another computer in the network that occurred in a first time period. The first time period can be a training time period.

The system determines (404) a respective first node score for each first node in the first directed graph. Each first node score indicates a respective importance value, e.g., popularity, of each first node during the first time period. The first node score can be a score determined by a link analysis algorithm, e.g., PageRank or HITS.

The system receives (406) test data. The test data has a data structure including a second directed graph. The second directed graph having second nodes and second directed edges. Each second node represents a respective computer in the network. Each second edge represents a request from a computer to access another computer that occurred in a second time period. The second time period can be a test time period.

In both the first time period and the second time period, each request is successfully authenticated and authorized by the computer receiving the request. The authentication and authorization can be performed by the computer receiving the request or by an external service.

The system determines (408) a respective second node score for each second node in the second directed graph. Each second node score indicates a respective importance value, e.g., popularity, of each second node during the second time period. Determining the second node score is performed using a link analysis algorithm that is the same as the algorithm used in determining the first node score.

Determining the second node score can include the following operations. The system can identify edges that appear in both the first directed graph and the second directed graph. The system can reduce the second directed graph by removing the identified edges from the second directed graph. The system then determines the second node scores based on the reduced second directed graph.

For each node that is in the first directed graph and the second directed graph, the system determines (410) a respective difference between the first node score of the node and the second node score of the node. For a node that is only in the second directed graph, the system can determine that the difference is the value of the second node score minus zero, which equals the value of the second node score.

In some implementations, determining the difference between the first node score and the second node score can include the following operations. The system can determine a difference in directions of edges between two first nodes the first directed graph and the two second nodes in the second directed graph, as shown in FIG. 2, the difference in directions indicating a different request order. The system can determine the difference between the first node score and the second node score based on the different request order.

The system designates (412) a computer corresponding to a node as an anomalous computer upon determining that the difference corresponding to that node exceeds a threshold value. The system can determine the threshold value based on empirical data indicating past attacks on the network. The system can determine that a user who initiated the requests in the second period is a suspect user who breached into the network upon determining that the difference exceeds the threshold value. The system can generate a report on the anomalous computer and on the user. The system can provide the report to a report consumer.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving training data, the training data having a data structure including a first directed graph, the first directed graph having first nodes and first directed edges between the first nodes, each of the first nodes representing a respective first computer in a network in a first time period, each of the first directed edges representing a respective first request from a first computer to access another first computer that occurred in the first time period;
determining, using a link analysis algorithm, a respective first node score for each of the first nodes in the first directed graph, each of the respective first node scores indicating a respective popularity of each of the first nodes during the first time period;
receiving test data, the test data having a data structure including a second directed graph, the second directed graph having second nodes and second directed edges, each of the second nodes representing a respective second computer in the network in a second time period, each of the second edges representing a respective second request from a second computer to access another second computer that occurred in the second time period;
generating a reduced second directed graph including:
identifying edges that appear respectively between nodes occurring in both the first directed graph and the second directed graph, and
removing, from the second directed graph, the identified edges that also appear in the first directed graph;
determining, using the link analysis algorithm, a respective second node score for each of the second nodes in the reduced second directed graph, each of the respective second node scores indicating a respective popularity of each of the second nodes during the second time period;
for each particular node that is in the first directed graph and the reduced second directed graph, determining a respective difference between the first node score of the particular node and the second node score of the particular node; and
designating a particular computer corresponding to a particular node as an anomalous computer upon determining that the difference corresponding to the particular node exceeds a threshold value,
wherein the method is performed by one or more computers.

2. The method of claim 1, wherein each request is successfully authenticated and authorized by the computer receiving the request or by an authentication service.

3. The method of claim 1, wherein determining the difference between the first node score and the second node score comprises:
    determining a difference in directions of edges between two first nodes in the first directed graph and two corresponding second nodes in the second directed graph, the difference in directions indicating a different request order; and
    determining the difference between the first node score and the second node score based on the different request order.

4. The method of claim 1, comprising determining that a user who initiated the requests in the second time period is a suspect user who breached into the network in response to determining that the difference exceeds the threshold value.

5. The method of claim 1, comprising determining the threshold value based on empirical data indicating past attacks on the network.

6. A system comprising one or more computers and one or more storage devices storing instructions that are operable, when executed by the one or more computers, to cause the one or more computers to perform operations comprising:
    receiving training data, the training data having a data structure including a first directed graph, the first directed graph having first nodes and first directed edges between the first nodes, each of the first nodes representing a respective first computer in a network in a first time period, each of the first directed edges representing a respective first request from a first computer to access another first computer that occurred in the first time period;
    determining, using a link analysis algorithm, a respective first node score for each of the first nodes in the first directed graph, each of the respective first node scores indicating a respective popularity of each of the first nodes during the first time period;
    receiving test data, the test data having a data structure including a second directed graph, the second directed graph having second nodes and second directed edges, each of the second nodes representing a respective second computer in the network in a second time period, each of the second edges representing a respective second request from a second computer to access another second computer that occurred in the second time period;
    generating a reduced second directed graph including:
        identifying edges that appear respectively between nodes occurring in both the first directed graph and the second directed graph, and
        removing, from the second directed graph, the identified edges that also appear in the first directed graph;
    determining, using the link analysis algorithm, a respective second node score for each of the second nodes in the reduced second directed graph, each of the respective second node scores indicating a respective popularity of each of the second nodes during the second time period;
    for each particular node that is in the first directed graph and the reduced second directed graph, determining a respective difference between the first node score of the particular node and the second node score of the particular node; and
    designating a particular computer corresponding to a particular node as an anomalous computer upon determining that the difference corresponding to the particular node exceeds a threshold value.

7. The system of claim 6, wherein each request is successfully authenticated and authorized by the computer receiving the request or by an authentication service.

8. The system of claim 6, wherein determining the difference between the first node score and the second node score comprises:
    determining a difference in directions of edges between two first nodes in the first directed graph and two corresponding second nodes in the second directed graph, the difference in directions indicating a different request order; and
    determining the difference between the first node score and the second node score based on the different request order.

9. The system of claim 6, the operations comprising determining that a user who initiated the requests in the second time period is a suspect user who breached into the network in response to determining that the difference exceeds the threshold value.

10. The system of claim 6, the operations comprising determining the threshold value based on empirical data indicating past attacks on the network.

11. A non-transitory computer storage medium encoded with instructions that, when executed by one or more computers, cause the one or more computers to perform operations comprising:
    receiving training data, the training data having a data structure including a first directed graph, the first directed graph having first nodes and first directed edges between the first nodes, each of the first nodes representing a respective first computer in a network in a first time period, each of the first directed edges representing a respective first request from a first computer to access another first computer that occurred in the first time period;
    determining, using a link analysis algorithm, a respective first node score for each of the first nodes in the first directed graph, each of the respective first node scores indicating a respective popularity of each of the first nodes during the first time period;
    receiving test data, the test data having a data structure including a second directed graph, the second directed graph having second nodes and second directed edges, each of the second nodes representing a respective second computer in the network in a second time period, each of the second edges representing a respective second request from a second computer to access another second computer that occurred in the second time period;
    generating a reduced second directed graph including:
        identifying edges that appear respectively between nodes occurring in both the first directed graph and the second directed graph, and
        removing, from the second directed graph, the identified edges that also appear in the first directed graph;
    determining, using the link analysis algorithm, a respective second node score for each of the second nodes in the reduced second directed graph, each of the respective second node scores indicating a respective popularity of each of the second nodes during the second time period;
    for each particular node that is in the first directed graph and the reduced second directed graph, determining a respective difference between the first node score of the particular node and the second node score of the particular node; and designating a particular computer corresponding to a particular node as an anomalous computer upon determining that the difference corresponding to the particular node exceeds a threshold value.

12. The non-transitory computer storage medium of claim 11, wherein each request is successfully authenticated and authorized by the computer receiving the request or by an authentication service.

13. The non-transitory computer storage medium of claim 11, wherein determining the difference between the first node score and the second node score comprises:

determining a difference in directions of edges between two first nodes in the first directed graph and two corresponding second nodes in the second directed graph, the difference in directions indicating a different request order; and determining the difference between the first node score and the second node score based on the different request order.

14. The non-transitory computer storage medium of claim 11, the operations comprising determining that a user who initiated the requests in the second time period is a suspect user who breached into the network in response to determining that the difference exceeds the threshold value.

* * * * *